Figure 1:
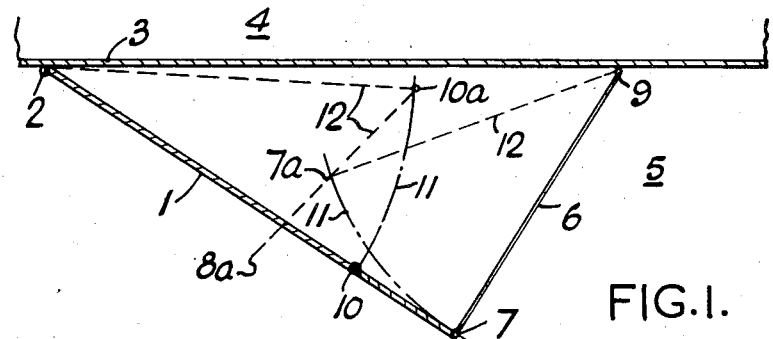

April 5, 1966 R. B. PAGE ETAL 3,244,245
VEHICLES FOR TRAVELLING OVER A SURFACE
Filed March 20, 1964 3 Sheets-Sheet 1

INVENTORS
R. B. PAGE
A. R. TRIPP
BY
Cameron, Kerkam & Sutton
ATTORNEYS

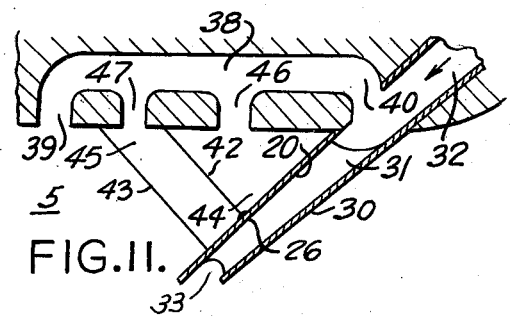
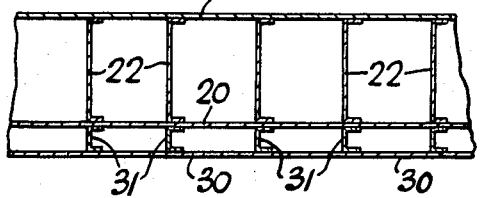
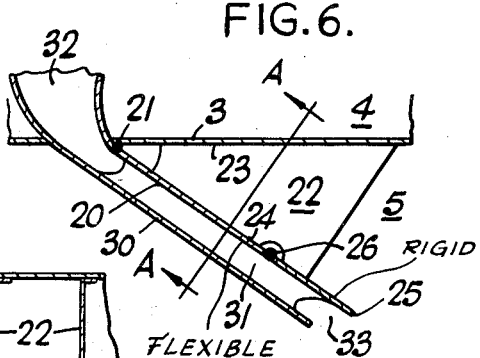
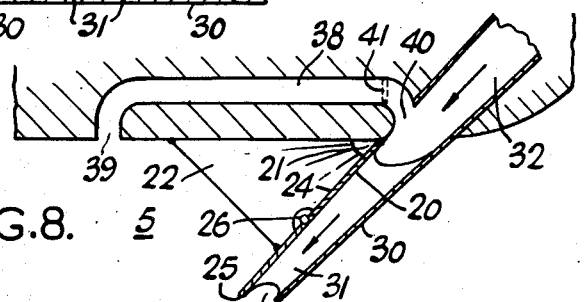
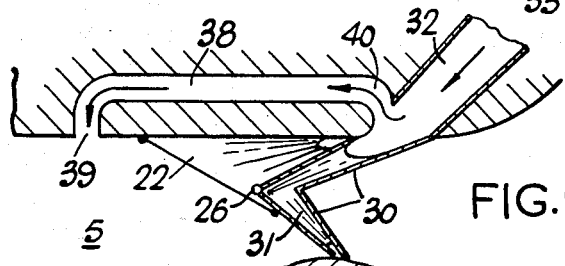
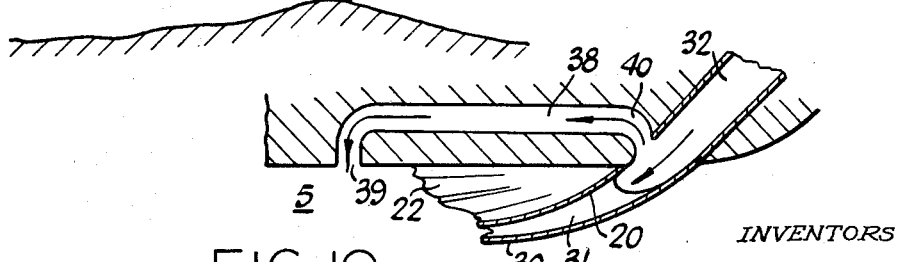

United States Patent Office 3,244,245
Patented Apr. 5, 1966

3,244,245
VEHICLES FOR TRAVELLING OVER A SURFACE
Reginald Bannerman Page, Hythe, and Alan Ritson Tripp, Southampton, England, assignors to Hovercraft Development Limited, London, England, a British company
Filed Mar. 20, 1964, Ser. No. 353,476
17 Claims. (Cl. 180—7)

This invention relates to vehicles for travelling over a surface and which in operation are supported above that surface, at least in part, by a cushion of pressurised gas formed and contained beneath the vehicle.

It has been proposed to contain the cushion for at least part of its periphery by a downwardly extending wall member which may be flexible and/or flexibly attached to the lower part of the vehicle. Such a downwardly extending member may also have provisions for causing a fluid to issue from the lower edge to assist in containing the gaseous cushion.

The member deflects when meeting obstacles and it is desirable that the wall member should be as light as possible and readily deflected so as to reduce the possibility of damage to the member itself and also to reduce the transmission of undesirable loads or shocks to the main body of the vehicle.

If the wall member is of very light construction, however, it is difficult to give it sufficient strength to sustain the cushion pressure. This can be overcome to some extent by providing one or more ties to restrain the wall member against the pressure of the cushion but whilst such an arrangement can be made to deflect inwards towards the cushion space quite readily, it is extremely difficult to provide for the member to deflect outwards, as may be necessary on contact with the ground or an obstacle, whilst at the same time resisting adequately the cushion pressure which it is required to contain.

Also, where the wall member is inclined inwards at its lower edge, as is usual, especially when fluid curtains are discharged from the lower edge, deflection inwards is readily attainable but deflection outwards results in an initial downward movement of the lower part of the member resulting in increased contact with the surface over which the vehicle is operating. Over a water surface for example, this results in a scooping action and severe loads can thus be applied to the member and to the vehicle.

It is thus desirable that the wall member should be capable of deflecting in both directions whilst at the same time being of light construction and capable of sustaining the cushion pressure. According to the present invention there is provided cushion containing means comprising a downwardly extending wall member, flexibly attached at its upper end to the part of the vehicle body, a tie flexibly attached at one end to the wall member at a position intermediate between the ends of the member and flexibly attached at its other end to the lower part of the vehicle inboard of the point of attachment of the upper end of the wall member, a hinge in the wall member at a position above the point of attachment of the tie, the wall member at least for its length below the hinge having sufficient stiffness to prevent substantial bending thereof at least when under load in a direction outward from the cushion space, whereby on contact with the surface such that the contact load is in the same direction as the cushion load the lower part of the wall member is deflected outwards away from the cushion space pivoting about the point of attachment of the tie, the wall member folding inwards at the hinge towards the cushion space so that the lower part of the wall member deflects upwards towards the lower part of the vehicle.

The wall member can be in the form of two substantially rigid parts joined at the hinge, or the part of the member above the hinge can be of flexible material or of a series of rigid sections flexibly connected. Similarly, the tie can be rigid, the flexibility of the attachment points being provided by hinges or other flexible forms of attachment, or the tie can be flexible, in which case the flexibility of the tie may also provide the flexibility of the attachment points. Alternatively the tie can comprise of rigid sections flexibly connected with suitable flexible attachments to the wall member and to the lower part of the vehicle.

The extent to which the wall member will deflect upwards will depend upon the relative dimensions of the various parts of the member and the tie, the geometry of the member and tie relative to the vehicle and upon the form of construction of the member and the tie. To control the vertical profile of the member, further ties may be necessary, a typical example being a tie connected at its lower end to the hinge point of the member.

Fluid curtains can also be formed from the bottom edges of wall members forming cushion containing means according to the invention. The curtains can be formed by fluid flowing down the insides of the members and issuing from the bottom edges. Alternatively a second member can be provided, either inside or outside of the first member and spaced slightly therefrom, to form a duct or nozzle through which fluid can flow to issue from the lower edge of the assembly to form a fluid curtain.

Figures 2, 3:
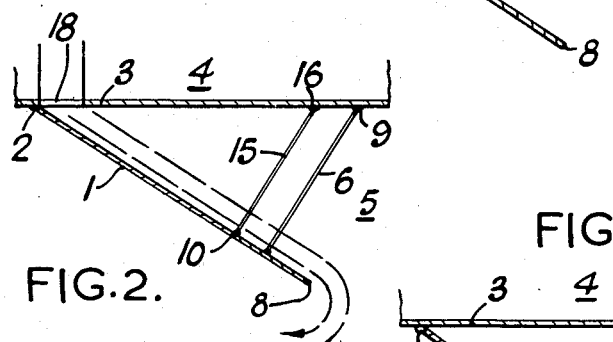
Figures 4, 5:
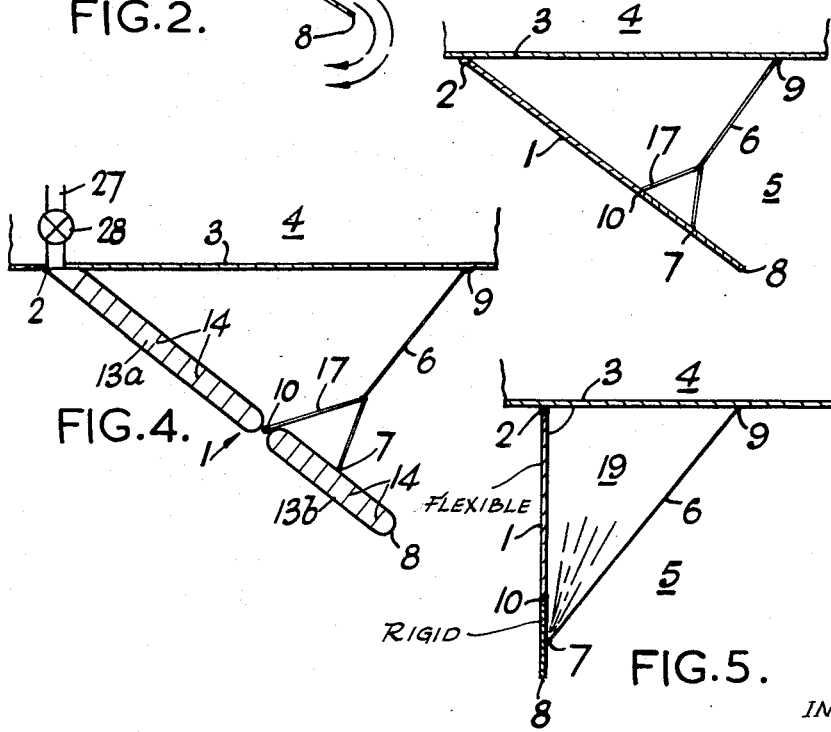
Figure 11A:
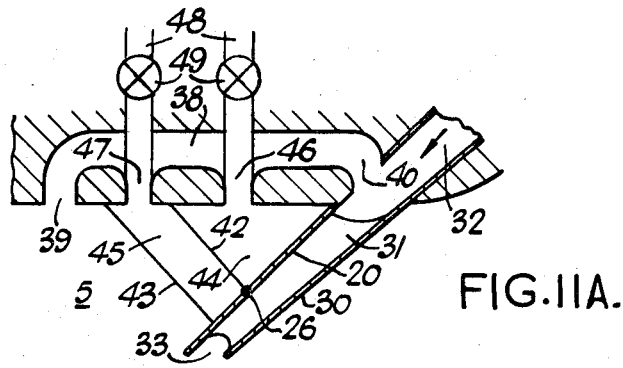
Figure 12:
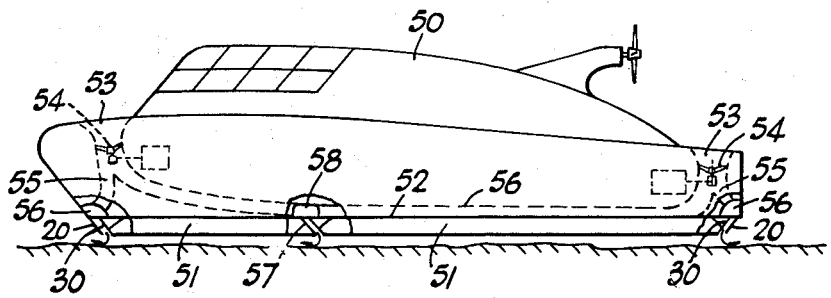
Figure 13:
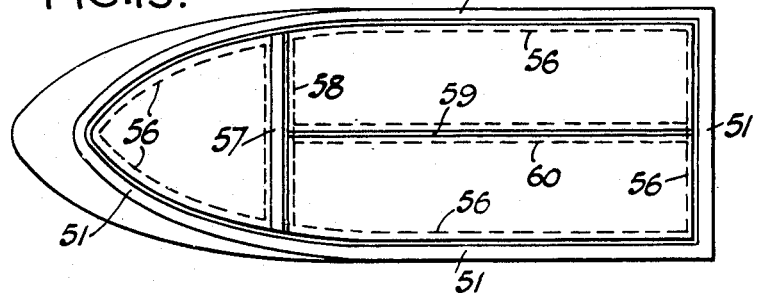
Figure 14:
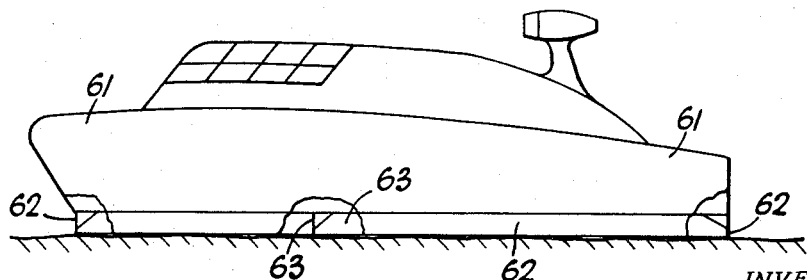

The invention will be readily understood from the following description of certain embodiments by way of example, in conjunction with the accompanying diagrammatic drawings in which:

FIGURE 1 is a vertical cross-section of a wall member according to the invention, FIGURE 2 is a cross-section similar to that of FIGURE 1 illustrating a modification thereof, FIGURE 3 is a further cross-section similar to that of FIGURE 1 illustrating another modification thereof, FIGURE 4 is a further cross-section similar to that of FIGURE 1 illustrating an inflated construction, FIGURE 5 is another cross-section similar to that of FIGURE 1 illustrating a vertical wall member, FIGURE 6 is a vertical cross-section of a further embodiment of the invention, FIGURE 7 is a cross-section on the line A—A of FIGURE 6, FIGURE 8 is a vertical cross-section of yet a further embodiment of the invention, FIGURE 9 illustrates an alternative operating condition of the embodiment illustrated in FIGURE 8, FIGURE 10 illustrates a further alternative operating condition of the embodiment illustrated in FIGURE 8, FIGURE 11 illustrates a modification of the embodiment illustrated in FIGURE 8, FIGURE 11A illustrates an alternate form of the embodiment of the invention shown in FIGURE 11, FIGURE 12 is a side view of a vehicle embodying one form of the invention, FIGURE 13 is an inverted plan view of the vehicle illustrated in FIGURE 12, and FIGURE 14 is another side view of a vehicle embodying an alternative form of the invention.

FIGURE 1 illustrates a form of the invention comprising a downwardly extending wall member 1 flexibly attached at the upper end 2 to the bottom surface 3 of a vehicle 4. The member 1 is inclined inwards towards the space 5 in which is formed the cushion of pressurised gas supporting, or assisting in supporting, the vehicle.

A tie 6 is flexibly attached at its lower end to a position 7 a small distance above the bottom edge 8 of the member 1. At its upper end the tie 6 is flexibly attached at 9 to the bottom surface 3 of the vehicle. A short distance above the attachment position 7 of the tie 6, a hinge point 10 is formed in the member 1.

Where the member 1 meets an obstacle which has a relative motion from left to right in FIGURE 1, then the member deflects inwards and upwards in the normal manner. When the member 1 meets an obstacle having a relative motion in the other direction, however, a force is applied at the bottom edge 8 of the member. The lower part of the member pivots about the position 7 causing the member to hinge at 10. At the same time the lower part of the member 1 also swings upward about the attachment point 9 of the upper end of the tie 6. The movement of the hinge 10 and the position 7 is shown by the chain dotted lines 11, the dotted lines 12 illustrating a deflected position of the member 1, the positions of 7, 8 and 10 being at 7(a), 8(a) and 10(a) respectively. Although the bottom edge 8 initially starts to move downward the swinging of the lower part of the member 1 about point 9 causes the lower part to move upwards and the combined movement results in only a very small initial movement downwards by the bottom edge 8 before it starts to move upwards.

The deflection of the member 1 is varied by the geometry of the arrangement. For example, the more inclined the tie 6, the more rapid will be the initial movement upwards of the position 7, and the bottom edge 8. However, if the tie 6 is other than normal to the member 1 when the member is in the fully extended position then a component of tensile or compressive stress will be produced in the member 1 by the stress in the tie. This is because the pressure of the gaseous cushion formed in the space 5 acts on the inside of the member 1 tending to push it outwards and is resisted by the tie 6. The length of the tie 6 and the length of the member 1 between the hinge 10 and attachment point of the upper end 2 of the member also affect the deflection. As a particular example, if all parts are to be kept taut during deflection, i.e. the member from 2 to 10, and from 10 to 7 and also the tie 6, then the length of that part of the member from 10 to 7 should be equal to the difference in lengths of the member from 2 to 7 and of the tie.

The more the bottom edge 8 projects below the position 7, the larger the turning moment will be when meeting an obstacle.

The construction of the wall member, and of the tie, can vary. For example, the member 1 can be substantially rigid from its upper end 2 to the hinge 10 and from the hinge 10 to the bottom edge 8. With such an arrangement there is a load tending to bend the member 1 at the hinge 10, the hinge tending to move outwards, due to the pressure of gaseous cushion in the space 5. This can be offset by making the hinge in such a manner that it can only bend in one direction, that is with the hinge 10 moving upwards towards the bottom surface 3. Alternatively a further tie can be provided between the bottom surface of the vehicle and the hinge or a position above the hinge. This is illustrated in FIGURES 2 and 3. In FIGURE 2, a separate tie 15 is flexibly attached at its lower end to the hinge 10 and at its upper end 16 to the bottom surface 3 of the vehicle. In FIGURE 3, a short tie 17 is connected between the hinge 10 and the tie 6.

If the member 1 is of flexible construction above the hinge 10 then it will be necessary to provide sufficient ties, or some alternate constraining means, to prevent distortion of the upper art of the member due to the cushion pressure. A typical example of an alternate constraining means is the provision of webs extending between the member and the bottom surface of the vehicle. Such webs will be described more fully in respect to FIGURES 5 and 6.

The stiffness of the member 1 can be obtained in various ways. The member can be of rigid material such as wood, metal, or the like or can be an inflated structure. When in the form of an inflated structure the stiffness of the member can be varied by varying the inflation pressure.

FIGURE 4 illustrates an inflated construction for the member 1 shown in the arrangement of FIGURE 3, similar references being applied. The member 1 comprises an upper inflated portion 13a and a lower inflated portion 13b. The inflated portions are constrained to the desired cross-section by ties 14. The lower inflated portion 13b can be permanently inflated to a pressure sufficient to provide the required stiffness, or the material of which the lower portion is made can provide some of the stiffness. The upper inflated portion 13a may also be permanently inflated, or may be inflated during operation via a pipe 27. A valve 28 can be provided in the pipe 27, to control the inflation pressure.

The operation of the arrangement shown in FIGURE 4 is the same as in the arrangements shown in FIGURES 1 to 3, as described above in relation to FIGURE 1. Further, only one of the portions 13a and 13b need be of inflated construction, the other portion being of some other construction.

The wall member can extend for the full height of the cushion or fluid can be caused to flow down the inside of the member and issue from the bottom edge 8 to form a fluid curtain, the fluid being supplied through a port as indicated at 18 in FIGURE 2. The fluid will generally be the same gas as forms the cushion, but other fluids such as water or steam, can be used.

It is possible to make the volume bounded by the member 1, the tie 6 and the bottom surface 3 of the vehicle into one or more fluid tight spaces. This is described below with reference to FIGURE 10. The space or spaces may extend for the whole of the volume or only a part thereof. The pressure within the space or spaces can be maintained constant or varied, as a whole or locally, as desired.

For the maximum cushion area, it is desirable that there should be no inward inclination of the wall member. Cushion containing means according to the invention can readily be arranged with the wall member vertically, as illustrated in FIGURE 5. In such an arrangement, either the member must be of rigid material or webs 19 be provided. In the latter case, the inner edges of the webs 19 can form the ties 6.

Where fluid curtains are formed from the bottom of a member it may be preferred to cause the fluid to issue from a supply port formed at the bottom of the member and supplied through a duct, rather than the fluid should merely flow down the inside of the member. Such an arrangement is illustrated in FIGURES 6 and 7. A member 20 extends downwardly and inwardly, being flexibly attached at its top edge 21 to the bottom surface 3 of the vehicle 4. Flexible triangular webs 22 are positioned between the bottom surface of the vehicle and the member, being attached on two sides 23 and 24 to the bottom surface 3 of the vehicle 4 and to the member 20 respectively. The webs extend down the member to a position a short distance above the bottom edge 25 of the member 20. A hinge 26 is formed in the member 20 a short distance above the position 24. The webs may be cut away at the locality of the hinge 26, and also at the junction of the top edge 21 and the bottom surface 3 to provide easy movement at these points. The member so far is generally of the form as illustrated in FIGURES 1, 2 and 3, with the variation that webs are used for the tie or ties.

Positioned on the outside of the member 20 is a further member 30. This member can be in the form of a flexible membrane or can be similar in construction to the member 20, that is it can have a hinge and be connected to the bottom surface of the vehicle by a tie, the bottom end of which is attached to the member 30 intermediate of the bottom edge and the hinge. In practice the tie will normally be an extension of the tie joining the inner member to the bottom surface of the vehicle. In FIGURES 6 and 7 the outer member 30 is joined to the inner member 20 by flexible webs 31, and these webs, or some of them, can form the extensions of the webs 22, to act as ties, the whole forming a nozzle structure. A fluid is fed down the duct formed by the members 20 and 30, from a supply duct 32 fed from a suitable source. The fluid issues from a supply port 33 formed at the bottom of the nozzle structure. In an alternative arrangement, the outer member can be of the general form as illustrated in FIGURES 1, 2 and 3, whilst the inner member is in the form of a flexible membrane.

When a fluid curtain is formed by fluid issuing from a nozzle structure as is illustrated in FIGURE 6 and 7, a difficulty can arise in that the supply port 33 may be closed when passing over an obstrutcion. The closing of the supply port 33 may be due to the blocking of the port by the surface of the obstruction or alternatively or in addition by the deflection of the members 20 and 30. If the supply port is closed, there is no supply of fluid to the cushion from the fluid curtain to make up for any losses which may occur. Further, a static pressure is set up in the duct formed by the members 20 and 30 which pressure stiffens up the nozzle structure making it less flexible.

A further difficulty is that when the vehicle to which the nozzle structure is attached is at rest, without the cushion in being, the supply port may be immersed, if the vehicle is floating on water, or be closed by deflection of the nozzle structure if the vehicle is resting on a hard surface. It may then not be possible to form a cushion without providing a separate means for supplying fluid to the cushion space to initially form the cushion.

The difficulties described above can be obviated, at least to some extent, by providing an alternative path or bypass for at least part of the curtain forming fluid to the cushion space.

FIGURES 8, 9 and 10 illustrate an arrangement in which an alternative path is provided in the main structure of the vehicle. FIGURE 8 illustrates the nozzle structure in its normal position, being generally of the form illustrated in FIGURES 6 and 7. Formed in the lower part of the vehicle body is a bypass duct 38. The duct connects at one end, via a port 39, with the cushion space 5, and at its other end, via a port 40, with the supply duct 32. The geometry of the supply duct, the nozzle structure formed by the members 20 and 30, the supply port 33 and the ports 39 and 40 can be such that, during normal operation, the static pressure at the port 40 is the same as the cushion pressure, so that no flow occurs through the duct 38. Alternatively a flap valve 41 can be provided.

When the nozzle structure is deflected outwards the deflection is as illustrated in FIGURE 9, the member 20 folding at the hinge 26. The flow of fluid to or through the supply port is restricted, and a pressure rise occurs in the supply duct. This pressure rise causes a flow of fluid through the bypass duct 38 into the cushion space 5. This flow also prevents an undesirable pressure rise in the supply duct 32 which would stiffen the nozzle structure and also affect the pressurizing means which supplies the curtain-forming fluid.

A similar flow of fluid will also occur when the nozzle structure is deflected inwards as illustrated in FIGURE 10. When the nozzle structure is deflected inwards, the flow to the supply port 33 may not be restricted but the port itself may be closed by the obstruction.

FIGURE 11 illustrates a modification of the arrangement illustrated in FIGURES 8, 9 and 10, in which the webs 22 are replaced by diaphragms 42 and 43. The diaphragms 42 and 43 extend for the length of the structure formed by the members 20 and 30 to form substantially fluid tight compartments 44 and 45. These compartments are connected to the bypass duct 38 by means of ducts 46 and 47 respectively. When the nozzle structure is in its normal position, as in FIGURE 11, the compartments are at cushion pressure. When the structure is deflected, the pressure in the compartments 44 and 45 rises, and provides an increased restoring force on the nozzle structure.

Alternatively, as illustrated in FIGURE 11A, a gas can be supplied to the compartments 44 and 45 via ducts 48. The pressure of the gas in the compartments can then be controlled by valves 49.

A further way of providing an alternative path for the curtain forming fluid is to provide one or more ports in the upper part of the inner member, possibly controlled by a flap valve. The effectiveness is reduced however, for large deflections of the nozzle structure.

FIGURES 12 and 13 illustrate a vehicle 50 having cushion containing means 51 extending all round the periphery of the bottom surface 52 of the vehicle. The cushion containing means is as the example illustrated in FIGURES 6 and 7, described above. Air is drawn in through intakes 53 at the front of and rear of the vehicle by propellers 54 and is fed through ducts 55 to a duct 56 extending round the periphery of the bottom surface 52. From the duct 56 it flows down between the members 20 and 30 and issues to form fluid curtains. The cushion is subdivided laterally by means 57 which are of the same form of the cushion containing means 51 and air is fed to the dividing means 57 via a duct 58. The cushion is further subdivided in the fore and aft direction by means 59 which can be vertical form of the example illustrated in FIGURES 6 and 7, or of any other form. Air is fed to the means 59 by a duct 60. Alternatively, the cushion can be subdivided by means according to the invention without the provision for forming fluid curtains from their lower edges. For example wall members of the form illustrated in FIGURE 1 and FIGURE 5 can be used.

FIGURE 14 illustrates a vehicle 61 in which the cushion is contained by cushion containing means 62 of the form illustrated in FIGURE 5, described above, without the provision of fluid curtains. The cushion is also subdivided laterally and in the fore and aft direction by means 63 also of the form illustrated in FIGURE 5.

A vehicle can use combinations of various forms of cushion containing members. Thus forms as in FIGURES 1, 2, 3 and 4 can be used for part of the periphery of a cushion whilst forms as in FIGURES 5 and 6 can be used for other parts. The invention can be applied to vehicles of the type in which the space occupied by the cushion or cushions is bounded along the sides of the vehicle by walls which depend from the bottom of the main body of the vehicle and extend in the fore and aft direction of the vehicle. The walls may or may not have the lower parts at all times immersed, when operating over water, and may be of flexible or rigid construction. In such vehicles, cushion containing means according to the present invention can be provided across the front and rear of the vehicle and can also be used to subdivide the cushion space.

Further, more than one cushion containing means may extend parallel to one another for part or the whole of the periphery of a cushion.

We claim:

1. A vehicle for travelling over a surface and which is supported above that surface, at least in part, by a cushion of pressurized gas formed and contained in a space beneath the vehicle wherein the space is bounded for at least part of its periphery by containing means comprising a downwardly extending wall member, flexibly attached at its upper end to a part of the vehicle body, a tie flexibly attached at one end to the wall member at a position intermediate between the ends of the member and flexibly attached at its other end to the lower part of the vehicle inboard of the point of attachment of the upper end of the wall member, and a hinge in the wall member at a position above the point of attachment of the tie, the wall member at least for its length below the hinge having sufficient stiffness to prevent substantial bending thereof at least when under load in a direction outward from the cushion space, whereby on contact with the surface such that the contact load is in the same direction as the cushion load the lower part of the wall member is deflected outwards away from the cushion space pivoting about the point of attachment of the tie, the wall member folding inwards at the hinge towards the cushion space so that the lower part of the wall member deflects upwards towards the lower part the vehicle.

2. A vehicle as claimed in claim 1 including means for supplying a fluid to the surface of the member facing towards the cushion space, to flow down said surface and issue from the lower edge thereof and form a curtain of moving fluid.

3. A vehicle as claimed in claim 1 wherein said tie is flexible.

4. A vehicle as claimed in claim 3 wherein the member for that part of its length above the hinge point is of flexible construction.

5. A vehicle as claimed in claim 4 wherein the member is of inflated construction.

6. A vehicle as claimed in claim 4 including a series of webs, extending, each in a vertical sense between said part and the lower part of the vehicle.

7. A vehicle as claimed in claim 6 wherein the webs act as said tie.

8. A vehicle as claimed in claim 1 comprising a deflectable member on one side of the downwardly depending member, extending substantially parallel thereto, to form a nozzle, structure, at least one supply port formed at the bottom of the nozzle structure and means for supplying a fluid to said nozzle structure to issue from said supply port to form a curtain of moving fluid.

9. A vehicle as claimed in claim 8 wherein said fluid supplied to the nozzle structure is a gas and in which a bypass is provided between the fluid supply means to the nozzle structure and the cushion space whereby when the flow of gas from the supply port is obstructed a flow of gas can occur through the bypass to the cushion space.

10. A vehicle as claimed in claim 8 wherein said deflectable member is positioned on the side of the downwardly depending member remote from the cushion space.

11. A vehicle as claimed in claim 10 wherein said deflectable member is of flexible material.

12. A vehicle as claimed in claim 8 wherein said tie comprises a fluid tight diaphragm extending between the nozzle structure and the lower part of the vehicle to form a fluid-tight space bounded by said tie, the nozzle structure and the lower part of the vehicle, means being provided to supply a gas to said space.

13. A vehicle as claimed in claim 12 wherein the fluid supplied to the nozzle structure is a gas and in which the means for supplying the gas to the nozzle structure also comprises the means for supplying gas to said space.

14. A vehicle as claimed in claim 12 wherein the fluid supplied to said nozzle structure is a gas and in which a bypass is provided between the fluid supply means to the nozzle structure and the cushion space, at least one duct connecting said fluid-tight space to said bypass.

15. A vehicle as claimed in claim 12 including means for controlling the pressure of the gas supplied to said fluid-tight space.

16. A vehicle as claimed in claim 1 wherein said tie comprises a fluid tight diaphragm extending between the member and the lower part of the vehicle, to form a fluid-tight space bounded by said tie, the member and the lower part of the vehicle, means being provided to supply a gas to said space.

17. A vehicle as claimed in claim 16 including means for controlling the pressure of the gas supplied to said space.

References Cited by the Examiner

UNITED STATES PATENTS 3,191,705   6/1965   Jones et al. _____ 180—7

BENJAMIN HERSH, *Primary Examiner.*

M. S. SALES, *Assistant Examiner.*